(12) United States Patent
Yi et al.

(10) Patent No.: US 10,750,325 B2
(45) Date of Patent: Aug. 18, 2020

(54) METHOD AND APPARATUS FOR TRANSMITTING DATA VIA ROAD SIDE UNIT IN WIRELESS COMMUNICATION SYSTEM

(71) Applicant: LG ELECTRONICS INC., Seoul (KR)

(72) Inventors: Yunjung Yi, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 15/743,266

(22) PCT Filed: Jul. 18, 2016

(86) PCT No.: PCT/KR2016/007799
§ 371 (c)(1),
(2) Date: Jan. 9, 2018

(87) PCT Pub. No.: WO2017/014514
PCT Pub. Date: Jan. 26, 2017

(65) Prior Publication Data
US 2018/0213365 A1    Jul. 26, 2018

Related U.S. Application Data

(60) Provisional application No. 62/193,599, filed on Jul. 17, 2015.

(51) Int. Cl.
*H04W 4/06* (2009.01)
*H04L 12/28* (2006.01)
(Continued)

(52) U.S. Cl.
CPC .......... *H04W 4/06* (2013.01); *H04L 12/2861* (2013.01); *H04W 4/021* (2013.01); *H04W 4/40* (2018.02); *H04W 72/005* (2013.01); *H04W 4/70* (2018.02)

(58) Field of Classification Search
CPC ....... H04W 4/06; H04W 72/005; H04W 4/70; H04W 4/046; H04L 12/2861
See application file for complete search history.

(56) References Cited

U.S. PATENT DOCUMENTS

2008/0095163 A1* 4/2008 Chen ................... H04L 45/16
370/392
2009/0046617 A1* 2/2009 Tenny ................. H04L 5/0064
370/312

(Continued)

FOREIGN PATENT DOCUMENTS

KR        101190835        10/2012

OTHER PUBLICATIONS

PCT International Application No. PCT/KR2016/007799, International Search Report dated Oct. 18, 2016, 2 pages.

*Primary Examiner* — Shailendra Kumar
(74) *Attorney, Agent, or Firm* — Lee Hong Degerman Kang & Waimey

(57) ABSTRACT

A method and apparatus for transmitting information in a wireless communication system is provided. A road side unit (RSU) for vehicle-to-everything (V2X) communication receives a message indicating an event from a vehicle user equipment (V-UE), and broadcasts information on the event to other V-UEs.

2 Claims, 18 Drawing Sheets

(51) Int. Cl.
*H04W 72/00* (2009.01)
*H04W 4/021* (2018.01)
*H04W 4/40* (2018.01)
*H04W 4/70* (2018.01)

(56) References Cited

U.S. PATENT DOCUMENTS

| | | |
|---|---|---|
| 2010/0164789 A1 | 7/2010 | Basnayake |
| 2012/0089319 A1 | 4/2012 | Basnayake |
| 2012/0202525 A1* | 8/2012 | Pettini .................. H04W 4/06 455/456.3 |
| 2014/0016534 A1* | 1/2014 | Kim ................ H04W 74/0833 370/312 |
| 2015/0077270 A1* | 3/2015 | Rubin ..................... G08G 9/02 340/903 |
| 2016/0098860 A1* | 4/2016 | Basra .................. H04L 67/325 345/633 |
| 2016/0227383 A1* | 8/2016 | Lin ........................ H04W 4/08 |
| 2016/0285935 A1* | 9/2016 | Wu ........................ H04W 4/90 |
| 2017/0339723 A1* | 11/2017 | Fujishiro ................ H04W 4/06 |
| 2018/0049060 A1* | 2/2018 | Fujishiro ............ H04W 72/042 |
| 2018/0160418 A1* | 6/2018 | Luo ...................... H04W 72/04 |

* cited by examiner

METHOD AND APPARATUS FOR TRANSMITTING DATA VIA ROAD SIDE UNIT IN WIRELESS COMMUNICATION SYSTEM

CROSS-REFERENCE TO RELATED APPLICATIONS

This application is the National Stage filing under 35 U.S.C. 371 of International Application No. PCT/KR2016/007799, filed on Jul. 18, 2016, which claims the benefit of U.S. Provisional Application No. 62/193,599, filed on Jul. 17, 2015, the contents of which are all hereby incorporated by reference herein in their entirety.

BACKGROUND OF THE INVENTION

Field of the Invention

The present invention relates to wireless communications, and more particularly, to a method and apparatus for transmitting data via a road side unit (RSU) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The pace of LTE network deployment is accelerating all over the world, which enables more and more advanced services and Internet applications making use of the inherent benefits of LTE, such as higher data rate, lower latency and enhanced coverage. Widely deployed LTE-based network provides the opportunity for the vehicle industry to realize the concept of 'connected cars'. By providing a vehicle with an access to the LTE network, a vehicle can be connected to the Internet and other vehicles so that a broad range of existing or new services can be envisaged. Vehicle manufacturers and cellular network operators show strong interests in vehicle wireless communications for proximity safety services as well as commercial applications. LTE-based vehicle-to-everything (V2X) study is urgently desired from market requirement, and the market for vehicle-to-vehicle (V2V) communication in particular is time sensitive. There are many research projects and field tests of connected vehicles in some countries or regions, such as US/Europe/Japan/Korea.

V2X includes a vehicle-to-vehicle (V2V), covering LTE-based communication between vehicles, vehicle-to-pedestrian (V2P), covering LTE-based communication between a vehicle and a device carried by an individual (e.g. handheld terminal carried by a pedestrian, cyclist, driver or passenger), and vehicle-to-infrastructure/network (V2I), covering LTE-based communication between a vehicle and a roadside unit (RSU)/network. A RSU is a transportation infrastructure entity (e.g. an entity transmitting speed notifications) implemented in an eNodeB (eNB) or a stationary UE.

V2X communication, a method for transmitting, e.g. broadcasting/unicasting, data via the RSU may be required.

SUMMARY OF THE INVENTION

The present invention provides a method and apparatus for transmitting data via a road side unit (RSU) in a wireless communication system. The present invention provides a method and apparatus for broadcasting/unicasting data via the RSU for vehicle-to-everything (V2X) communication.

In an aspect, a method for transmitting, by a road side unit (RSU) for vehicle-to-everything (V2X) communication, information in a wireless communication system is provided. The method includes receiving a message indicating an event from a vehicle user equipment (V-UE), and broadcasting information on the event to other V-UEs.

In another aspect, a method for performing, by a road side unit (RSU) for vehicle-to-everything (V2X) communication, broadcast transmission in a wireless communication system is provided. The method includes configuring resources for broadcast transmission to vehicle user equipments (V-UEs), and performing the broadcast transmission to the V-UEs.

Data can be transmitted via RSU for V2X communication efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
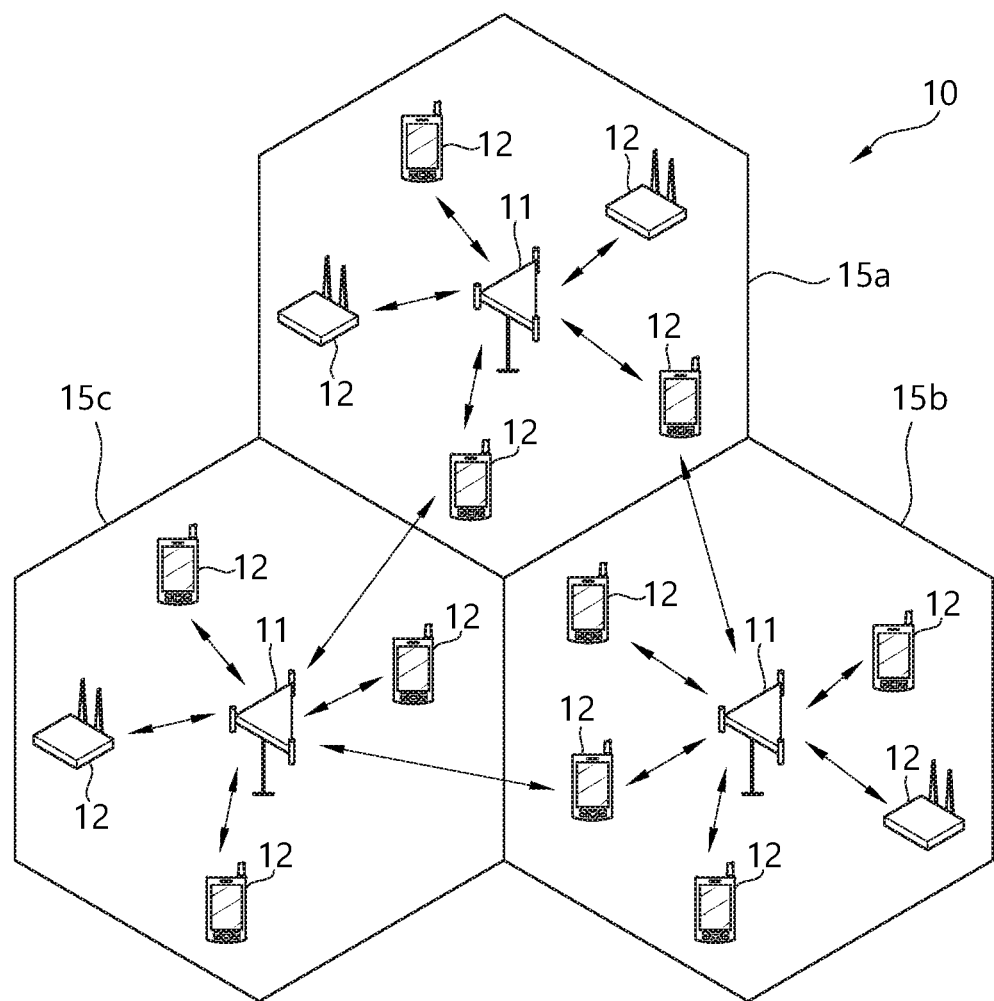
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
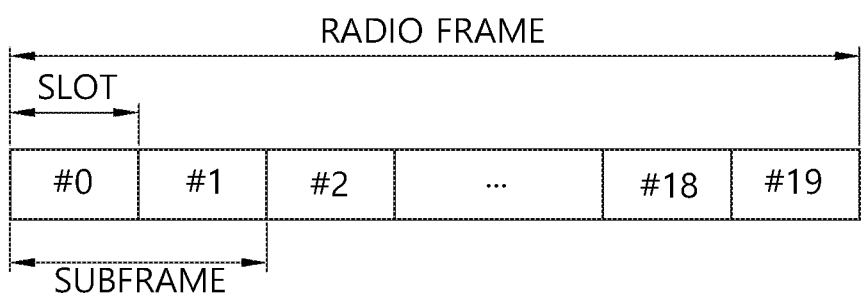
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
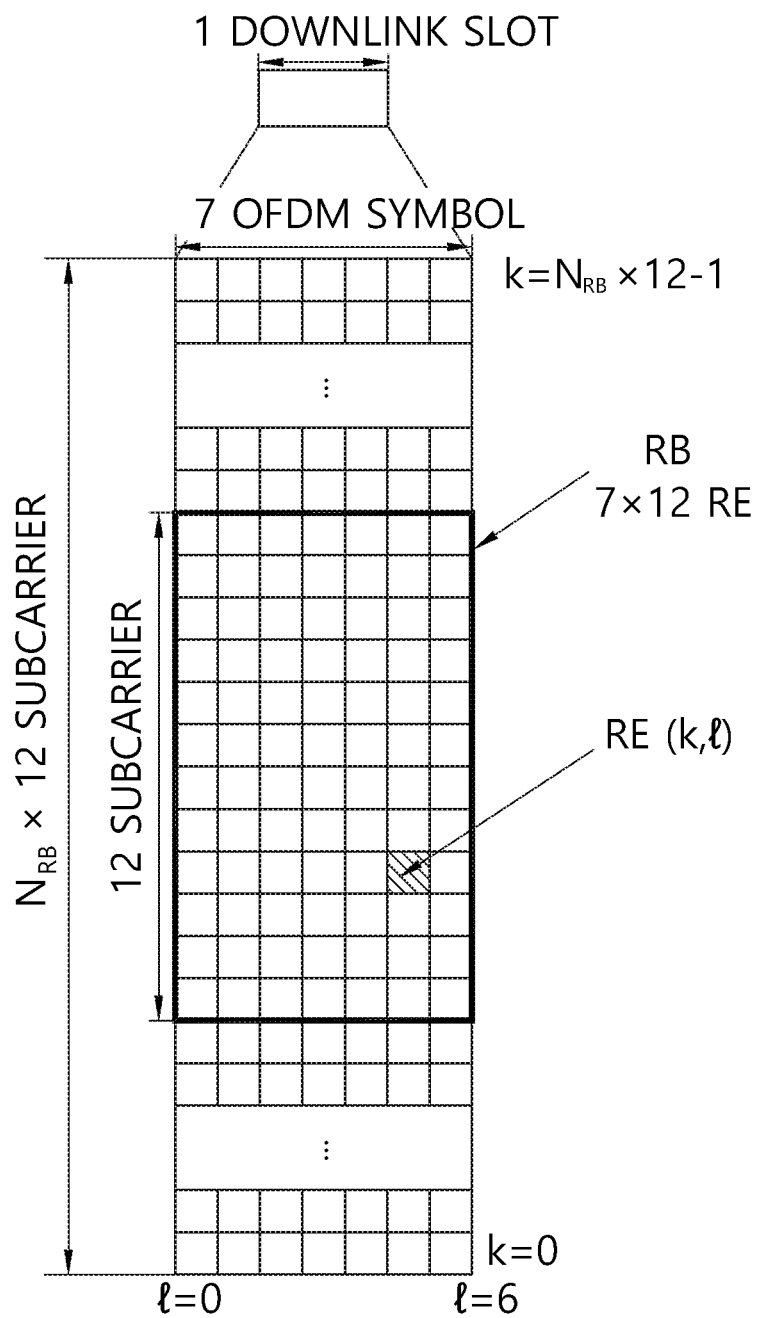
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
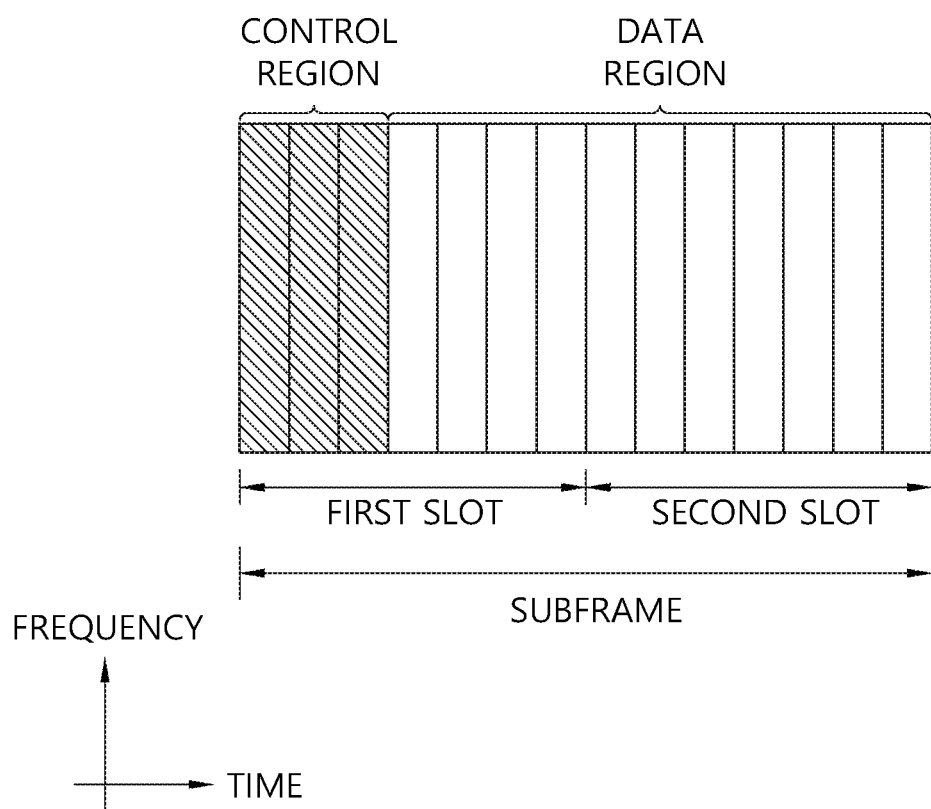
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
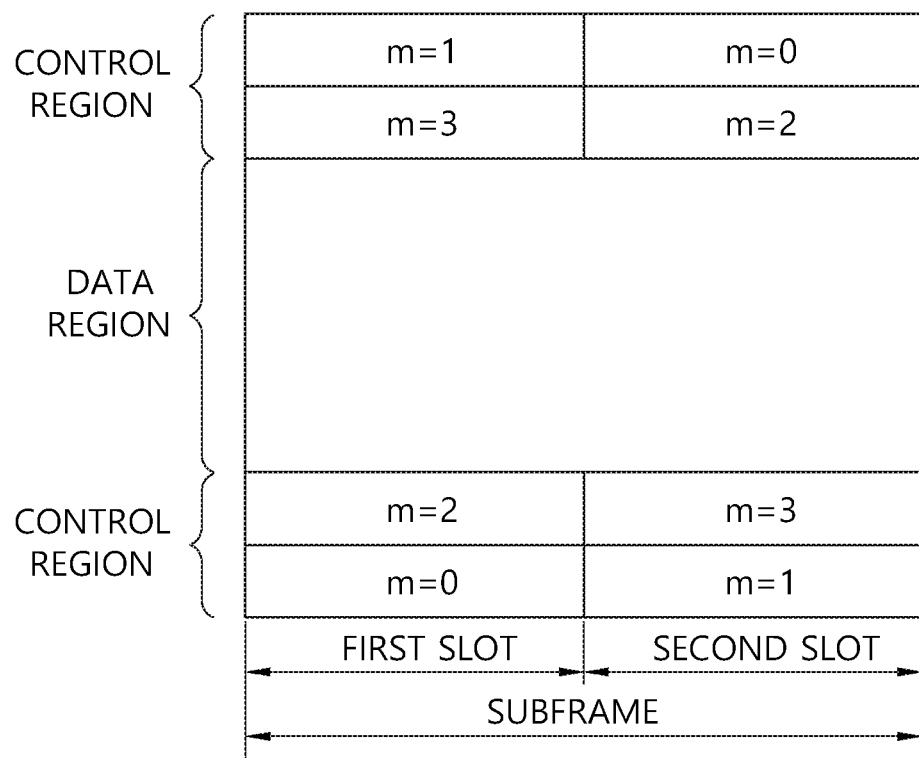
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Vehicle-to-everything (V2X) communication is described. V2X communication contains three different types, which are vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X Service, where one party is a UE and the other party is a road side unit (RSU) both using V2I application. The RSU is an entity supporting V2I service that can transmit to, and receive from a UE using V2I application. RSU is implemented in an eNB or a stationary UE. RSU will be described below in detail. V2P service is a type of V2X service, where both parties of the communication are UEs using V2P application. V2N service is a type of V2X Service, where one party is a UE and the other party is a serving entity, both using V2N applications and communicating with each other via LTE network entities.

For V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X Service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X service, e.g., RSU, application server, etc.

For V2I, the UE supporting V2I applications sends application layer information to RSU. RSU sends application layer information to a group of UEs or a UE supporting V2I applications. V2N is also introduced where one party is a UE and the other party is a serving entity, both supporting V2N applications and communicating with each other via LTE network.

For V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X Service. The UE supporting V2P applications transmits application layer information. Such information can be broadcast by a vehicle with UE supporting V2X service (e.g., warning to pedestrian), and/or by a pedestrian with UE supporting V2X service (e.g., warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

The RSU is described. In V2X communication where each vehicle UE (hereinafter, V-UE) communicates with each other directly (i.e. V2V communication), quality of communication can be reduced due to resource collision of each V-UE, Doppler shift by fast speed of V-UE, etc. Or, direct communication between V-UEs may be difficult due to distance between V-UEs. In order to solve the problem describe above, an infrastructure equipment (IE) for V2X communication may be deployed in the neighborhood of V-UEs in order to support V2V communication. The IE for V2X communication may receive and store a message for V2V communication from one V-UE and forward the corresponding message to other V-UEs. By deploying the IE for V2X communication, issues for deterioration of communication quality and/or a case that direct communication between V-UEs are not possible can be solved.

Figure 6:
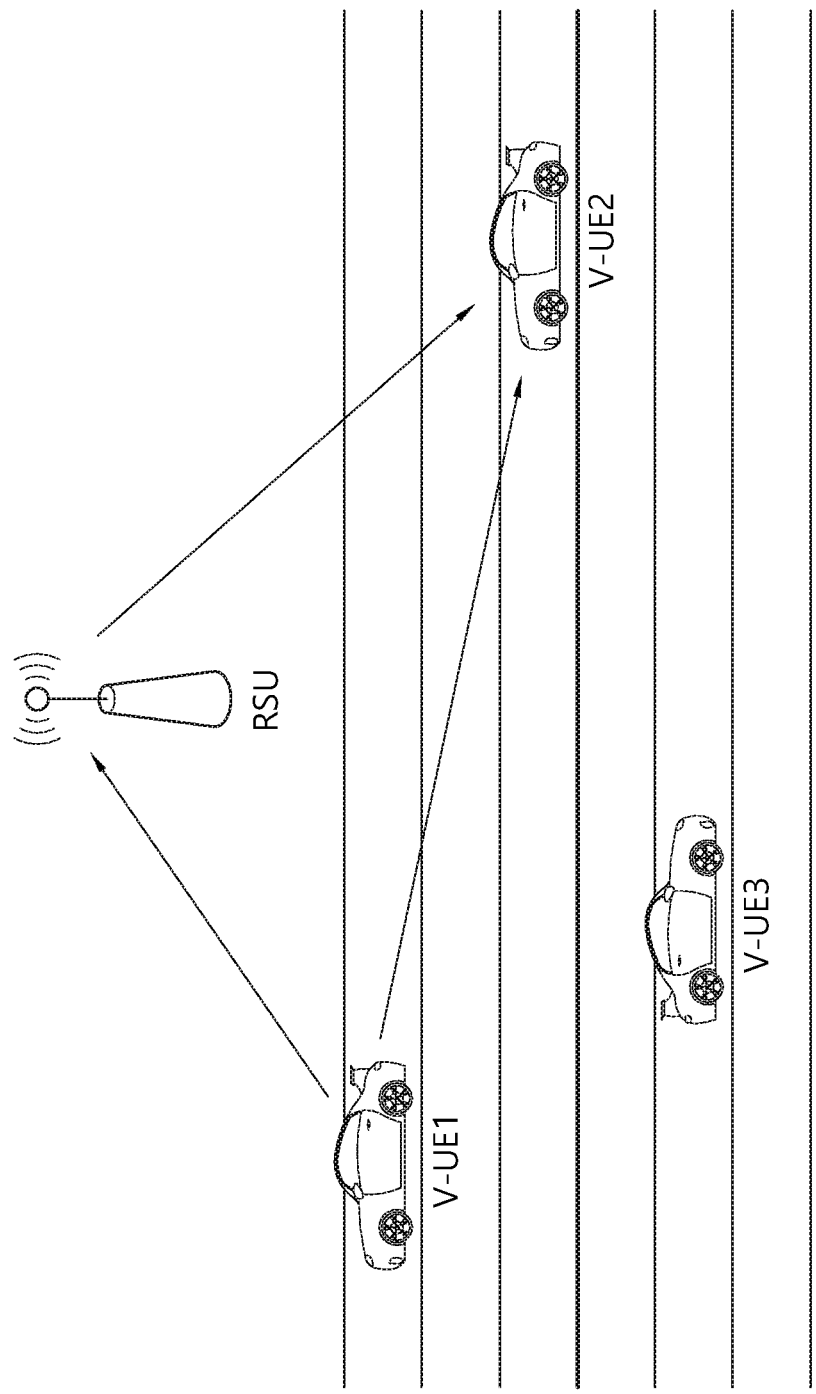
FIG. 6 shows an example of V2X communication via RSU according to an embodiment of the present invention.

FIG. 6 shows an example of V2X communication via RSU according to an embodiment of the present invention. Referring to FIG. 6, V-UE2 may receive a V2V message of V-UE1 from V-UE1 directly. Or, V-UE may a V2V message of V-UE1 from V-UE1 indirectly via the IE for V2X communication. The IE for V2X communication may be a network node corresponding to the existing cellular network, e.g. eNB, a new entity for V2X communication, a new gateway for V2X communication of the cellular network. Or, the IE for V2X communication may be a RSU which is deployed for V2I or I2V communication. In this embodiment, the IE for V2X communication is the RSU. In some cases, the IE for V2X communication may be a specific V-UE or a cellular UE.

The RSU is an independent device which has a memory unit and can access to infrastructure. The RSU may be deployed in the road side, and may be fixed in the specific location. There may be two types of RSU, one of which is eNB-type RSU (hereinafter, RSU-E) which may provide service and schedule data without any assistance or association with any other eNB or cell. The other is UE-type RSU (hereinafter, RSU-U) which needs to be associated with a serving cell or a cell to be able to provide service. When the RSU-U is out-of-coverage, the RSU-U may provide service based on preconfigured resource and/or configuration. Unless noted otherwise, the present invention may be applied to both types of RSU.

The RSU may have at least one of the following functionalities.

(1) Repeat/relay operation between one or more V-UE(s) to other V-UE(s)

(2) Store some events and broadcast the stored events periodically or based on the request (3) Resource management, e.g. control the congested channel/resource (4) Dynamic adjustment or adaptation of resource The present invention may focus on the functionality of (2) and (4).

In terms of frequency in which the RSU operates, one of the following cases may be considered.

(1) Case 1: Licensed spectrum may be used for RSU. In this case, generally, resource pool(s) may be configured by a cell or preconfigured resource pool(s) may be used for V2V operation.

(2) Case 2: Dedicated spectrum may be used for RSU, and a carrier may be shared between RSU and V-UEs.

(3) Case 3: Dedicated spectrum may be used, and a carrier used for RSU may be separate from a carrier used for V-UEs. More than one carrier may be used for RSU.

Unless noted otherwise, the present invention may be applied to all three cases described above.

Further, in terms of a V-UE association with RSU, one of the following scenario in Table 1 may be considered.

TABLE 1

| | RSU-E (licensed carrier) | RSU-U (licensed carrier) | RSU-E (V2X dedicated carrier) | RSU-U (V2X dedicated carrier) |
| --- | --- | --- | --- | --- |
| V-UE support single TX/RX | Scenario 1: V-UE may be associated with RSU-E. In case of connected, eNB assisted or autonomous operation may be feasible. In case of no | Scenario 2: Out-of-coverage Autonomous operation may be feasible In case a V-UE is connected with the network, eNB assisted or | Scenario 3: Only V2X service may be supported | Scenario 4: Out-of-coverage Autonomous operation may be feasible |

TABLE 1-continued

|  | RSU-E (licensed carrier) | RSU-U (licensed carrier) | RSU-E (V2X dedicated carrier) | RSU-U (V2X dedicated carrier) |
|---|---|---|---|---|
|  | camp-on, only autonomous operation may be feasible. | autonomous operation may be feasible. |  |  |
| V-UE support multiple TX/RX | Scenario 5: V-UE may be associated with eNB in the same or different frequency | Scenario 6: V-UE may be associated with eNB in the same or different frequency | Scenario 7: V-UE may be associated with eNB in the different frequency | Scenario 8: V-UE may be associated with eNB in the different frequency |

(1) Scenario 1: V-UE supporting single TX/RX may be associated with RSU-E operated in licensed carrier. Since this scenario corresponds to in-coverage scenario, the V-UE may not be allowed to perform V2X communication without camp-on or being associated with RSU-E. Or, V-UE may be able to listen on V2X traffic, though transmission is not allowed without being associated with RSU-E.

(2) Scenario 2: V-UE supporting single TX/RX may be associated with RSU-U operated in licensed carrier. Since there may be network coverage, it may not be allowed that a V-UE and RSU-U perform V2X communication without cell association. There may be infrastructure in the same frequency. This scenario is similar to Rel-12 device-to-device (D2D) scenario.

(3) Scenario 3: V-UE supporting single TX/RX may be associated with RSU-E operated in V2X dedicated carrier. Since RSU-E generally may not provide any other service than V2X communication in the V2X dedicated carrier, V-UE may also not perform other service in that frequency with single TX/RX capability. A type of time division multiplexing (TDM) approach between licensed carrier and the V2X dedicated carrier may be further considered. In this case, V-UE may perform similar operation as discontinuous reception (DRX) in the licensed carrier when the V-UE operates in the V2X dedicated carrier.

(4) Scenario 4: V-UE supporting single TX/RX may be associated with RSU-U operated in V2X dedicated carrier. In this scenario, if allowed, out-of-coverage operation may be feasible. Otherwise, similar to the scenario 3 mentioned above, a V-UE may be associated with a serving cell in different frequency, and the V-UE may access the V2X dedicated carrier via DRX in the serving cell frequency.

(5) Scenario 5-8: V-UE supporting multiple TX/RX may be associated with RSU-E/RSU-U operated in licensed carrier/V2X dedicated carrier. These scenarios may be similar to multi-carrier D2D scenarios. In case of RSU-E in the V2X dedicated carrier, a scheduling assignment (SA) or control information may be also transmitted in the V2X dedicated carrier. In such a case, OFDMA-based DL signal format may be used in the V2X dedicated carrier in a TDM or frequency division multiplexing (FDM) manner.

Figure 7:
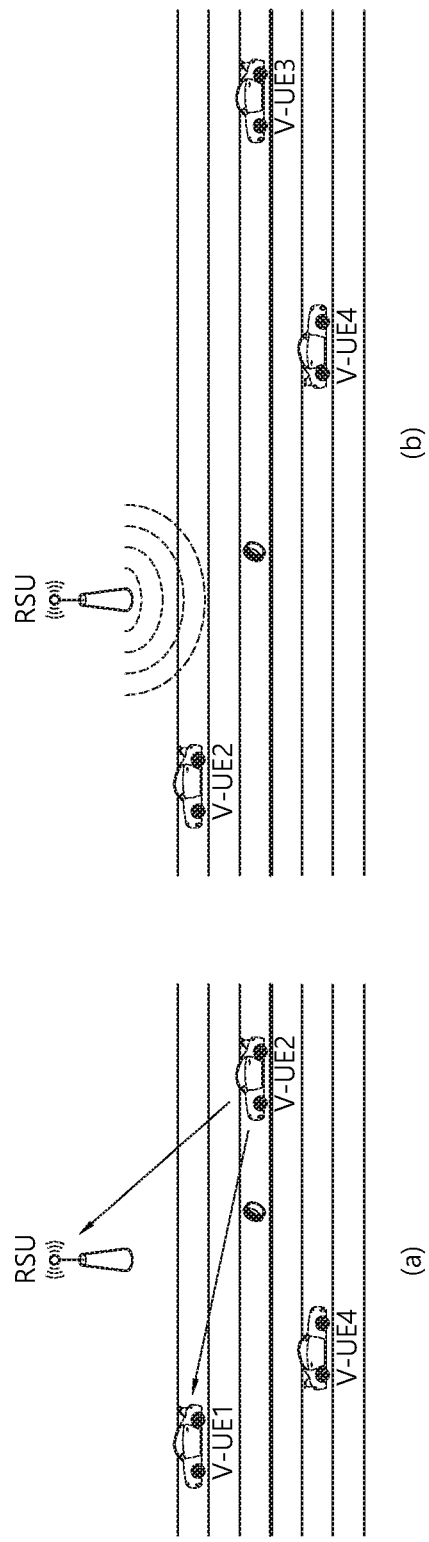
FIG. 7 shows a scenario of transmitting data via RSU according to an embodiment of the present invention.

FIG. 7 shows a scenario of transmitting data via RSU according to an embodiment of the present invention.

Referring to FIG. 7-(a), V-UE2 has detected hazard event (e.g. bumper, area with dropped object such as broken tire(s), glass, etc.) in some location, which requires caution to upcoming V-UEs. When detecting the hazard event, the V-UE2 may photograph the surrounding area when the driver (human or vehicle auto-driving software) suddenly steps on the brake though traffic situation has not been changed or when the driver suddenly changes the lane though the speed of vehicle has not been changed (i.e. the driver detects the hazard area in front and change the lane). Or, when detecting the hazard event, the driver may initiate hazard event logging, which triggers informing the hazard event to the near-by V-UEs, e.g. V-UE1, and/or RSU(s).

Information on the hazard event may be photographed and stored in near-by RSU(s) for the following V-UEs. The following V-UEs, e.g. V-UE3, may not be directly reachable by the V-UE2. Thus, the V-UE2 may ask a RSU to store and broadcast the information on the hazard event. For example, the V-UE2 may transmit a message which contains at least one of the following to the RSU.

The location of hazard event

The object of hazard event, such as broken tire

The picture of hazard event

Time of detection

Duration of hazard event (best guess): Based on the type of the hazard event, the V-UE may provide the estimated duration of the detected hazard event.

Referring to FIG. 7-(b), upon receiving the message from the V-UE2, the RSU may initiate a broadcast or multicast session which periodically broadcast the information on the hazard event. The RSU may broadcast the information on the hazard event for other upcoming V-UEs, e.g. V-UE3.

Figure 8:
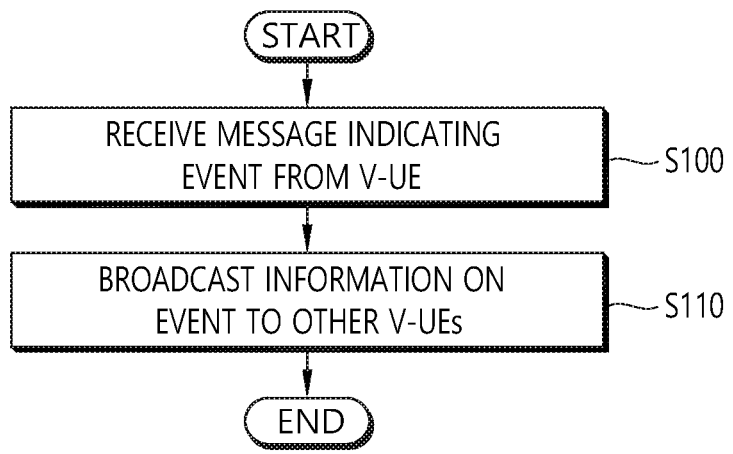
FIG. 8 shows a method for transmitting data via RSU according to an embodiment of the present invention.

FIG. 8 shows a method for transmitting data via RSU according to an embodiment of the present invention.

In step S100, the RSU receives a message indicating a hazard event from V-UE2.

When the V-UE2 detects the hazard, the V-UE2 first may broadcast a message via direct communication over PC5 interface such that other V-UEs can be notified the hazard event. Additionally, the V-UE2 may also transmit a message to the near-by or serving RSU over Uu interface to notify the hazard event. If the RSU is already broadcasting the hazard event to other V-UEs, since it is already reported, V-UE2 may not transmit the message to the RSU. It may be handled by V2X application.

When the RSU receives the message from V-UE2 or other V-UE(s), the RSU may store the message. Based on the duration information of the hazard area which may be included in the message, the RSU may store the message for the duration. Since multiple V-UEs may have transmitted the message regarding the same hazard event, the RSU first may check the duplication of the hazard event and update the information on the hazard event based on the newly received information. For detecting duplication of the hazard event, the location information of the hazard may be used. Or, it may be differentiated based on vision.

In step S110, the RSU broadcast the information on the hazard event to other V-UEs.

The information on the hazard event, without receiving from the core network, may be propagated to other V-UEs. Considering that the RSU-E may not equipped with any D2D TX functionality, the RSU-E may overhear the D2D TX from other V-UEs if the hazard event is to be broadcasted via direct communication.

For fetching the information on the hazard event from the RSU, one of the following options may be considered.

(1) Option 1: The RSU may periodically broadcast the information on the hazard event via such as single-cell point-to-multipoint (SC-PTM) transmission or multimedia broadcast multicast services (MBMS) transmission. The resource for the message may be reserved in resource pool which is shared between V-UEs and RSUs for V2V communication.

Assuming that the RSU-E is capable of performing relaying from a V-UE to other V-UEs, this procedure may be achieved by relaying the information on the hazard event many times during a period for the given message. In other words, for relaying operation by the RSU-E, the number of repetitions, the interval between two repetitions, and the destination may be configured. The destination may correspond to address of the hazard event. For example, if the information on the hazard event is broadcast periodically and the duration is 1 hour and the interval between two repetitions is 100 ms, the number of repetitions may be 36000. For another example, if the information on the hazard event is broadcast only once, the number of repetition is 1 and the interval between two repetitions in infinite. In other words, relay operation may be expanded to cover one-to-many relay operation between the original information and the relayed information.

(2) Option 2: Assuming that the location of the RSU is known publically and a V-UE knows the direction in advance, the V-UE may transmit a query to the candidate RSU(s) for any information regarding the area where the V-UE will pass in a near future. Since maintaining SC-PTM session requires overhead, and uses the resources continuously regardless of the existence of any V-UE who wants to acquire the information, transmission of stored information may be initiated only via proactive query procedure. In terms of query/response, one of the following options may be considered.

(1) Query via licensed UL carrier and response via licensed carrier: The message may be directly or indirectly delivered to the RSU, possibly relayed by the network.

(2) Query via V2X dedicated carrier and response via licensed carrier (3) Query via V2X dedicated carrier and response via V2X dedicated carrier It is generally desired that the response is broadcast regardless of which frequency is used so that other V-UEs can also overhear the transmission. In the query message, at least one of the followings may be included.

Event type which request for further information (e.g. further details on a hazard)

Interested area (e.g. (x1, y1) to (x2, y2))

Response valid time (e.g. 40 ms): How long the requested V-UE can wait until receiving the response. If the response cannot be received within the valid time, the response may be dropped. In case a V-UE is very near to the event location, the valid time may be very small. This value may be further used for quality of service (QoS) or prioritizing message(s). If there is no urgency, this value may be set to zero.

Timestamp of transmission time of the query message: Along with the response valid time, this may be used to determine the necessity of the response and potentially priority of the message. If there is no urgency, this value may be set to zero.

Location of the V-UE transmitting the query message: The location of current V-UE may be transmitted in the query message such that the RSU and/or other V-UEs potentially broadcast any data which requires attention by the requester. In other words, the query message may also be used between direct communication between V-UEs or between relay station and V-UEs.

Destination address: If the V-UE transmitting the query message knows the identifier of the RSU, this field may include the ID of the target RSU. If there is no target receiver, this field may be set to broadcast address.

Message ID: A random number may be generated by the V-UE which will be used for message ID in order to differentiate the query message from other message. The response message may also include the message ID to match the request and response. To generate random number, current time and/or UE ID and/or service type of request may be used.

Speed of the V-UE: Based on the speed information, the RSU may be able to determine the approximated arrival time near the event area. Instead, the approximated delay to the target location may be transmitted.

Since the query message may be used with broadcast destination, all V-UEs as well as RSUs in the proximity may receive the query message. In such a case, all V-UEs may response as well which may cause message explosion. To avoid such a case, some message filtering may be used. For example, only RSU(s) may respond to any query message from the V-UE. Alternatively, only RSU(s) and relay-capable V-UEs may response to any query message from the V-UE. Alternatively, all V-UEs and RSU(s) may respond as long as it does not hear the response from any other V-UE or RSU. In other words, this may require sensing on the message. For example, the message ID used for the response which is generated by the requester may be used to detect the duplicate message. Another approach is to give higher priority on RSU(s) such that non-RSU(s) should wait one or a few resource opportunities before attempting to respond. It will attempt to response when it does not hear any response from RSU during the waiting time.

Optionally, acknowledgement (ACK) may be transmitted either via licensed carrier or V2V dedicated carrier. Otherwise, once the RSU received the query message, the RSU may retransmit for a certain duration to enhance the reliability.

Further, the query message may be used for some other purpose as well. For example, the query message may be used to indicate the current location and approximated arrival time near the RSU. Accordingly, the RSU may be ready to turn on the light and it may turn off the light if there is no car in the proximity. For another example, the query message may be used to download traffic information, etc., which may be large in size when a V-UE approaches the RSU via V2X communication. For another example, the query message may also be used for delivering an urgent message which may not be deliverable via V2V communication due to the lack of visible cars or congestion, etc.

Figure 9:
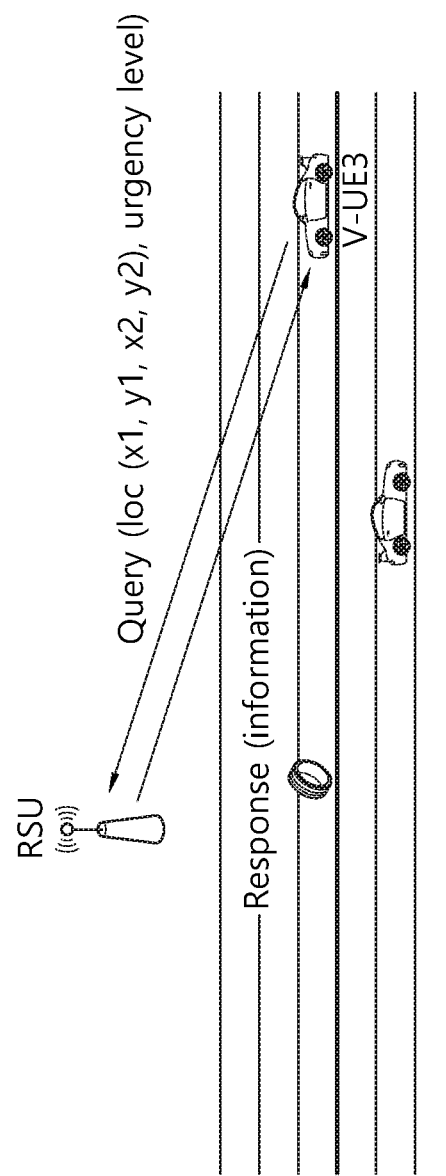
FIG. 9 shows a method for transmitting data via RSU according to another embodiment of the present invention.

FIG. 9 shows a method for transmitting data via RSU according to another embodiment of the present invention. Referring to FIG. 9, it is assumed that V-UE3 knows the location of the RSU and the direction of itself in advance. The V-UE3 moves towards the area of the hazard event. Accordingly, the V-UE3 transmit a query for the area towards which the V-UE3 moves. The query may be a function of a location and urgency level. In response, the RSU transmits the information on the queried area to the V-UE.

Options (1) and (2) described above may be supported simultaneously, or used independently. Furthermore, a hybrid approach of both options may also be considered. For example, partial information, such as a list of potential events, may be broadcasted periodically, whereas each V-UE may transmit individual query to the RSU for further detailed information such as downloading the picture of hazard area(s)/object(s). If hybrid approach is used, option (1) may be used where option (2) may also be used as complementary.

Hereinafter, a method for broadcasting the stored information by the RSU according to an embodiment of the present invention is described in detail.

Figure 10:
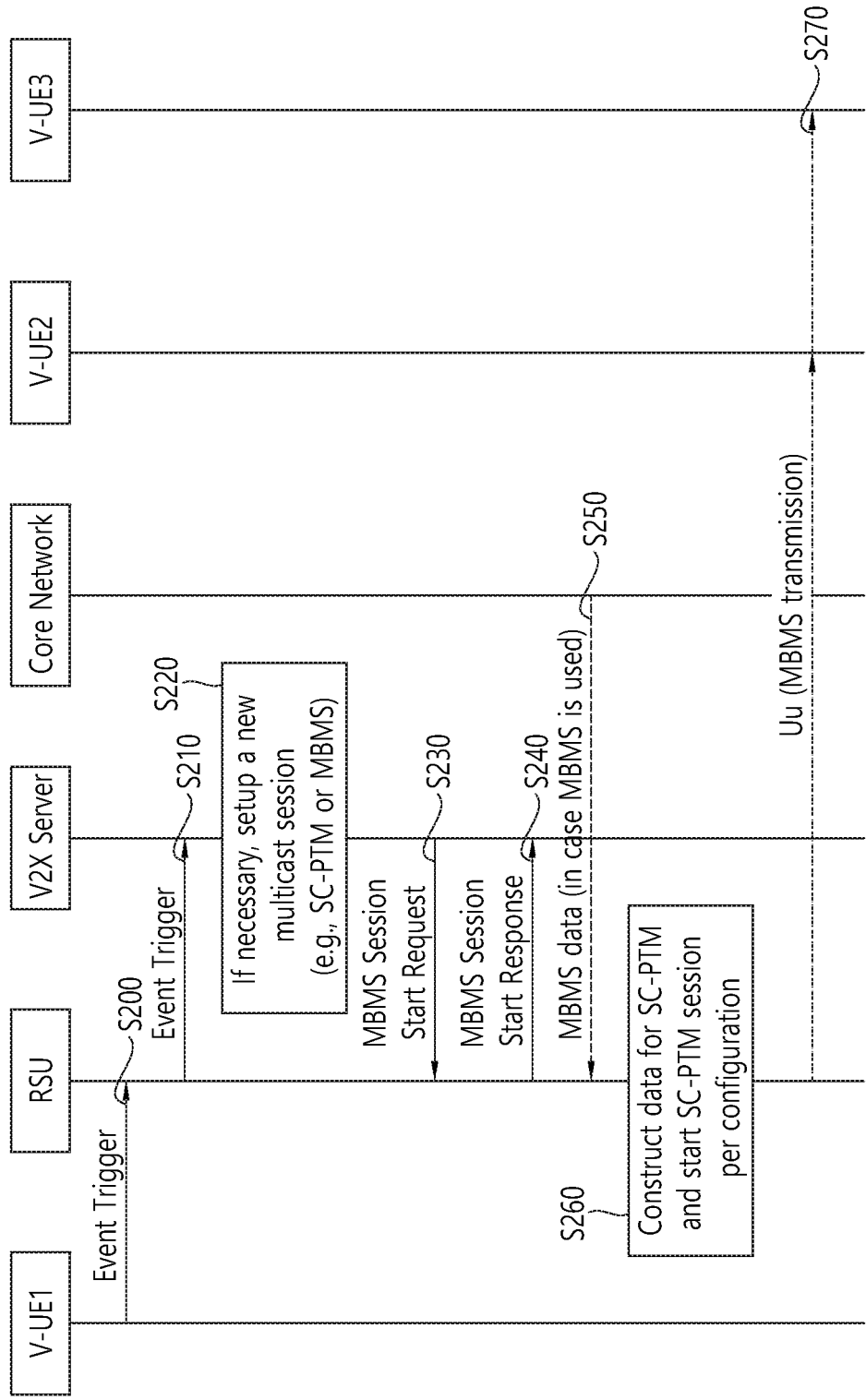
FIG. 10 shows a method for transmitting data via RSU according to another embodiment of the present invention.

FIG. 10 shows a method for transmitting data via RSU according to another embodiment of the present invention. The RSU may inform the hazard event via periodic multicast/broadcast. It may be done via single-cell broadcast/multicast (e.g. SC-PTM) or multi-cell broadcast/multicast (e.g. MBMS)

In step S200, the V-UE1 reports the hazard event to the RSU. In step S210, the RSU transmits an event report which may tag the information for further broadcast/indication to the V2X server. Further, the RSU may also indicate the desire of initiating multicast/broadcast session.

The V2X server may handle all necessary broadcast/multicast session information considering inter-cell or inter-RSU interference and resource consumption. The V2X server may also perform resource coordination and/or management among RSUs. Based on the currently on-going multicast sessions, V2X server may determine whether to initiate a new multicast session, e.g. SC-PTM or MBMS session. If necessary, in step S220, the V2X server may setup a new multicast session (e.g. SC-PTM or MBMS). In step S230, the V2X server may transmits a MBMS session start request message to the RSU, and in step S240, the RSU may transmit a MBMS session start response message to the V2X server.

In case MBMS session is initiated, since the common data should be broadcasted among collaborating cells, it is natural to assume that the data may be generated from external entity from core network (e.g., from internet transaction server (ITS) server) (in step S250). Or, if MBMS service is used rather locally where a few RSUs, for instance, collaborate and broadcast data, one RSU may become a data source and the data may be forwarded to other RSU via backhaul interface or air interface. In either way, for some RSU, if MBMS is used, data may be transmitted from an external entity and the data may be forwarded by the RSU according to MBMS configuration.

This procedure may be more aligned with the RSU-E. In case of RSU-U, a cell may indicate the RSU-U to start multicast/broadcast session. In case of out-of-coverage, a V-UE may perform one-to-many relay operation in a preconfigured resource with preconfigured configuration. In such a case, preconfigured information may include resource, the periodicity of one-to-many relay operation, a message type which may be relayed via one-to-many relay operation, etc. One-to-many relay operation may be defined as "A device transmits/repeats the same message many times with a certain periodicity".

In step S260, the RSU may construct data for SC-PTM and start SC-PTM session per configuration. SC-PTM operation may be more appropriate for RSU-E rather than RSU-U. When SC-PTM is used, the data may be constructed and broadcasted locally. Even in this case, to minimize the interference to other neighboring RSUs or maximize the efficiency (via e.g. utilizing low-interference resource), SC-PTM configuration may be configured by V2X server. For configuring SC-PTM session, at least one of the following approaches may be considered.

(1) Preconfigured resource configuration: For example, the control channel for SC-PTM used by each RSU may be prefixed such that a V-UE can read the resources without any other configuration. In this case, each RSU may run only one SC-PTM and the resource for control channel transmission may rather be fixed. The control channel may schedule the resource, periodicity, modulation and coding scheme (MCS), etc., of SC-PTM data transmission. In order not to increase control channel acquisition latency which also defines data acquisition latency, it may be generally desirable that at least 40 or 80 ms periodicity for control channel is necessary.

(2) Each RSU may transmit broadcast information such as system information. The broadcast information may include cell ID, information of SC-PTM sessions, resource partitioning, etc. The broadcast information may be similar to legacy system information block (SIB). If such broadcast information is transmitted, SC-PTM configuration may be broadcasted by the broadcast information.

(3) Serving cell may indicate SC-PTM configuration of RSU(s). This implies that a V-UE which receives data from the RSU may not be associated with the RSU. However, the V-UE may have associated with the serving cell via licensed band. In that case, the SC-PTM configuration may be transmitted by the serving cell. This approach may assume that the V-UE is connected to the serving cell and the RSU is able to transmit its configuration to the serving cell. For example, the RSU transmits its configuration information to the V2X server which controls the RSUs, and the V2X server may forward the SC-PTM configuration to serving cells in the region. That is, rather that the RSU itself transmits the SC-PTM configuration of itself to V-UEs, the serving cell may indicates the SC-PTM configuration via licensed carrier to V-UEs. In this case, SC-PTM configuration of a RSU may be queried by a V-UE or the serving cell may broadcast SC-PTM configuration of RSUs or the serving cell may transmit unicast or multicast to a group of UEs or single UE of SC-PTM configuration of relevant RSU(s). For this, the serving cell may have to keep track of the location of served UE.

Alternatively, in case a V-UE is associated with the RSU (i.e. the RSU is the serving cell), the RSU may directly transmit its SC-PTM configuration to the V-UE as well. However, in most cases, the coverage of the RSU is rather limited compared to the eNB in licensed spectrum such as a macro cell. Thus, it is generally preferred to maintain the connectivity (or C-Plane) via licensed spectrum regardless of connection/association between V-UE and RSU. When the V-UE is associated with the RSU as well, it may be viewed as dual connectivity between licensed spectrum and the dedicated spectrum for V2X communication.

(4) Reference cell(s) may broadcast SC-PTM configuration of RSU(s). A V-UE may listen on a reference cell to catch the SC-PTM configuration of RSU(s). This SC-PTM configuration may be forwarded by the serving cell in a payload format. In other words, The SC-PTM configuration may be transmitted by the V2X server or a cell which may be interpreted at the application layer of V2X communication.

There may reference cell(s) or V2X server(s) which stores the SC-PTM configuration of RSU(s), which may be queried via the V-UE. The query may be performed via licensed spectrum through the serving cell or may be performed via the RSU on the V2X dedicated carrier which may be forwarded to the V2X server as well. If V2V communication does not support unicast, the response may be delivered via broadcast.

Considering that there may be multiple V2X dedicated carriers and the RSU may select its operating frequency/carrier (i.e. not prefixed) from the multiple V2X dedicated carriers, the indication of used frequency by the RSU may be indicated in prior via such as the serving cell or the V2X server. Each RSU may transmit necessary information including frequency/carrier where each RSU is operating. Further, one frequency/carrier among multiple V2X dedicated carriers may be used for beacon transmission. In such a case, frequency/carrier for beacon transmission may be rather fixed or known to the UE in prior via signaling from the serving cell or a cell or the V2X server.

In the present invention, it is assumed that multicast/broadcast from the RSU occurs in the same frequency which is used for direct communication between V-UEs. In other words, if the V2X dedicated carrier is used for direct communication between V-UEs, the RSU may use the same frequency or the same band to transmit broadcast/multicast data. However, unicast transmission from the RSU to the V-UE or from the V-UE to the RSU may be performed through another carrier e.g. licensed carrier.

In current MBMS configuration structure, SIB(s) broadcast a list of MBSFN area for multicast control channel (MCCH) transmission configuration (including periodicity, timing information and MCS used for control channel transmission). In each repetition interval, MCCH may be transmitted at the configured timing occasion. Based on modification period, each MCCH transmits the configuration of multicast traffic channel (MTCH) which defines semi-static configuration of timing and MCS of MTCH. Per configuration carried in MCCH, MTCH (data channel) may be transmitted.

Since semi-static configuration is given by SIB for MCCH and MCCH for MTCH, the change of MBMS configuration is currently very challenging. Assuming that multicast/broadcast is used widely for V2X communication and/or internet-of-thins (IoT) services, it may be considered to allow dynamic configuration change of data channel and/or control channel configuration and/or SC-PTM area configuration.

For example, channel like system information may broadcast a list of {SC-PTM ID, service type, a carrier}. The service type may indicate which service/application may be supported by SC-PTM ID. The carrier may indicate where the service occurs. SC-PTM ID may be used for reading control channel similar to PDCCH or enhanced PDCCH (EPDCCH) (e.g. SC-PTM is used for radio network temporary identity (RNTI)). The control channel may be transmitted by being semi-statically configured which are shared among different SC-PTM groups. Furthermore, channel like system information may also broadcast the resource pool information of control channel or control/data channel for multicast/broadcast transmission. If resource pool does not change so dynamically, it may be prefixed as well.

Figure 11:
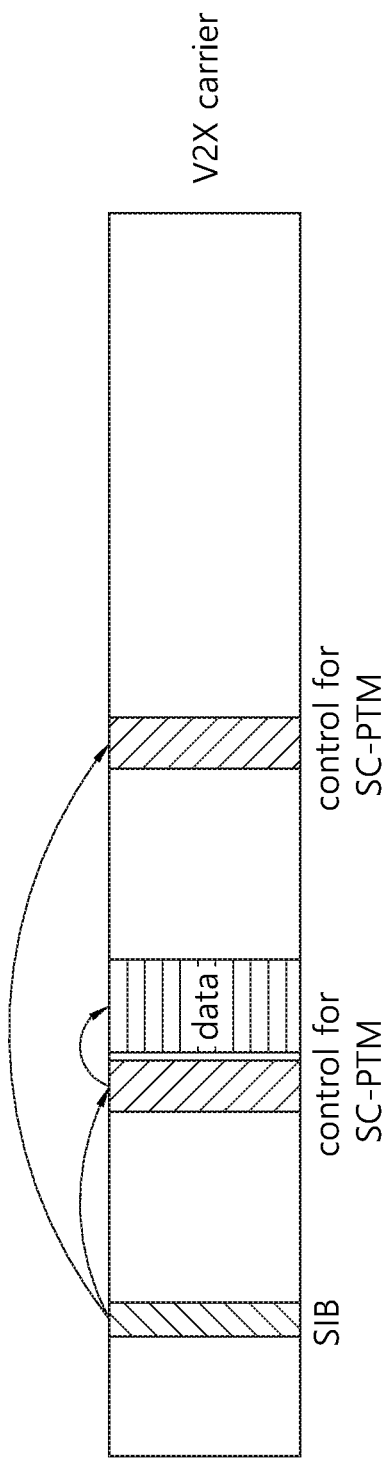
FIG. 11 shows an example of SC-PTM configuration for V2X communication according to an embodiment of the present invention.

FIG. 11 shows an example of SC-PTM configuration for V2X communication according to an embodiment of the present invention. This embodiment corresponds to a single carrier case. Referring to FIG. 11, broadcast channel, e.g. SIB, indicates a control channel for SC-PTM. The broadcast channel may broadcast a list of {SC-PTM ID, service type, a carrier} and/or the resource pool information of control channel or control/data channel for multicast/broadcast transmission. The control channel for SC_PTM may indicate a data channel.

Figure 12:
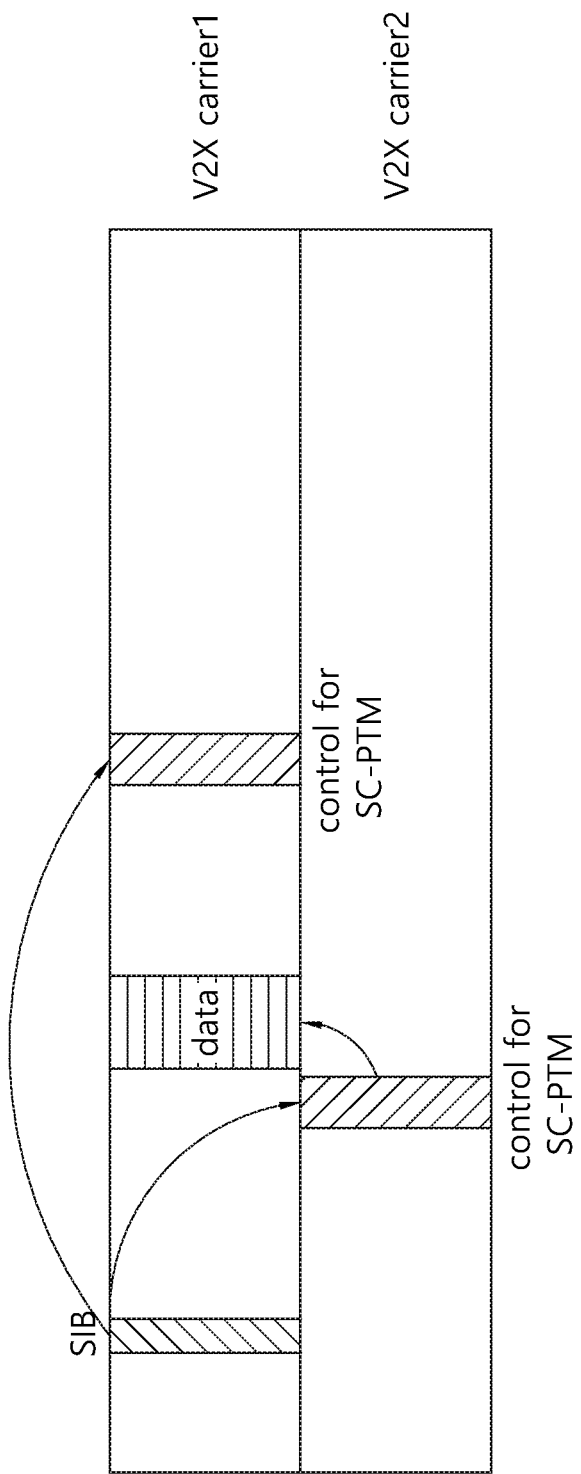
FIG. 12 shows another example of SC-PTM configuration for V2X communication according to an embodiment of the present invention.

FIG. 12 shows another example of SC-PTM configuration for V2X communication according to an embodiment of the present invention. This embodiment corresponds to multiple carrier case. Considering multiple carriers, configuration of resource pool may include the carrier index. More generally, resource block in different carrier may be indicated via scheduling information and/or configuration.

Furthermore, control channel may be hopped over carrier based on prefixed or configured hopping pattern. In such a case, configuration of control channel may also include hopping pattern. Since the subframe index may not be used for V2X carrier, the hopping pattern may work based on the index of control channel occasion. For example, starting from SI transmission, the first control channel occasion may occur in carrier 1, the second control channel occasion may occur in carrier 2, and so on. In other words, hopping pattern may be applied per each control channel transmission. Or, frequency of control channel/data channel may change which is indicated by SIB.

In other words, the SC-PTM transmission may be very similar to management of D2D transmission resource pool. Different from D2D TX resource pool, handling of resources used by the RSU in a dedicated fashion among potentially multiple SC-PTM services may be possible. For example, if the number of resource block is indexed from 0 to N−1 per each control resource pool occasion, the resource block index=(SC-PTM ID % N) may be used for SC-PTM service with SC-PTM ID. For this, a V-UE does not have to read all resource blocks. Rather, the V-UE may check only a few resource blocks which are interested in listening. If there are scheduled data channel, a V-UE may further proceed on reading data. Otherwise, the V-UE may skip data decoding until the next control resource pool occasion. The resource block may not be physically located in the same subframe or continuous in time. The index of resource block may be rather logical and the formation may be determined based on the configuration of resource pool for control message transmission.

In terms of which data is scheduled by the RSU and what format is used, synchronization signals may not be transmitted by the RSU. Or, if synchronization signal is transmitted by the RSU, a similar format used for D2D operation for V2V may be used by the RSU as well. In other words, the signal may be transmitted as a D2D UE rather than an infrastructure in the V2X dedicated carrier. The V2X dedicated carrier is a dedicated carrier or resource pool which is dedicated used for V2X operation. Thus, the licensed carrier shared between V2X communication and wide area network (WAN) may not be a dedicated carrier or resource pool. When the RSU transmits signals in this V2X dedicated carrier, the same format used for V2V operation and/or direct communication between V-UEs may be used as well. However, the resource may be separated between normal direct transmission/reception and RSU transmission. Based on these assumptions, at least for the RSU to support a broadcast/multicast operation, data like system information may be transmitted periodically.

Further, a cell ID of the RSU may be known to the V-UE via some mechanism. For example, the serving cell may inform the cell ID list of RSUs on the path. Or, the V-UE may query the list of cell IDs of RSUs of interest to the V2X server which contains the information of RSU. This approach may be more useful in case a RSU would not be equipped with full functionality of the eNB. Rather, the RSU may be equipped with UE capabilities. In such cases, instead of cell ID, a UE ID of the RSU may be queried proactively or known in prior. The known ID may be used for security purpose, e.g. encryption/decryption of data. However, the RSU may not have any connectivity to the infrastructure as well as the V-UE does not have any connection to the infrastructure. In such case, the acquisition of necessary information may be done via air interface between RSU and V-UEs, or the information may be known in prior in a pre-fixed fashion. In other words, if the RSU and/or V-UE does not have any coverage, the operation may work based on the prefixed configuration/information. For another example, different synchronization signal which may include a cell ID may be used. This may increase the burden on UEs. However, if the timing of synchronization signal is predetermined, a V-UE may attempt to blindly detect the cell ID.

Regardless of synchronization signal, a channel which transmits configuration of SC-PTM session or multicast session may be transmitted periodically via broadcast. To support this, semi-static information regarding SC-PTM which mainly cover {SC-PTM ID, service type, carrier index} may be transmitted. The time/frequency resource of control/data channel transmission of each SC-PTM session may be rather dynamic similar to unicast traffic transmission. To minimize time to read/monitor for potential SC-PTM transmissions, preconfigured resource for at least control channel may be further considered.

However, SC-PTM session initiated by the RSU itself may be more dynamically configurable compared to MBMS services which require some coordination with other neighbor cells or coordination from the V2X server. Thus, when MBMS is used for broadcast/multicast transmission, semi-static configuration of MBMS may be used. If that is used, the change of content dynamically may not be so straightforward. Therefore, dynamic broadcast, similar to D2D operation for broadcast operation, by the RSU for local information such as information on the hazard event may be utilized. In addition, MBMS services may be used for other wide-range information such as traffic situation, construction area, etc.

Resource configuration of SC-PTM/MBMS transmission by the RSU according to an embodiment of the present invention is described. It is possible that all resources are available for V2V communication. Or, a resource pool may be allocated for V2V communication depending on frequency and/or usage of spectrum. Thus, in the present invention, it may be assumed that a logically contiguous resource block may be indexed from 0 to L−1. L is the number of resource blocks in the interval between two consecutive system information transmissions. For example, if 100 RBs of system bandwidth and TTI=1 ms is used for V2V communication, and system information is transmitted in every 40 ms, L=4000. Based on the logically indexed resource block, which are determined based on TDD/FDD, dedicated/shared, etc., the resource dedicated for RSU system information transmission by the RSU may be defined by at least one of the followings.

Periodicity, such as the periodicity of system information block: For example, if system information is transmitted in every 40 ms, system information by the RSU may be transmitted in every 40 ms.

The number of resource blocks used for system information transmission in terms of resource block: How many resource blocks may be used for system information Offset of system information transmission in terms of resource block: Starting resource block in each interval.

Figure 13:
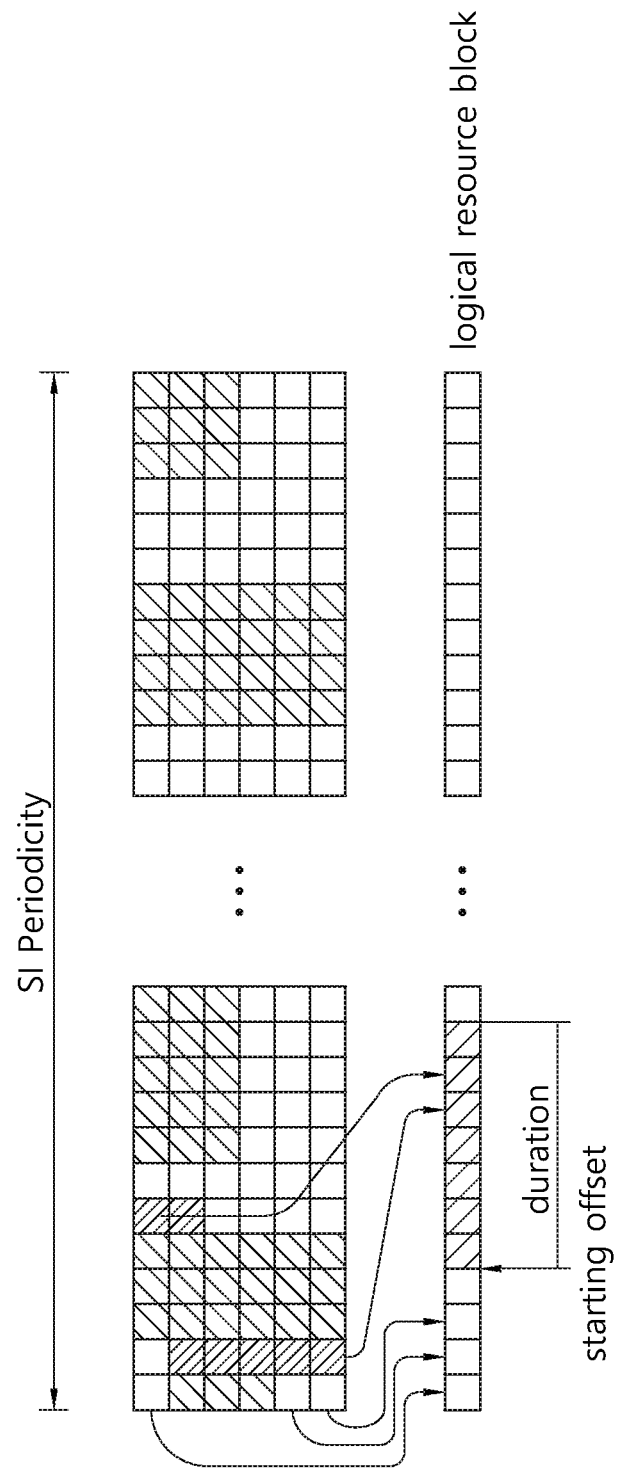
FIG. 13 shows an example of system information transmission by the RSU according to an embodiment of the present invention.

FIG. 13 shows an example of system information transmission by the RSU according to an embodiment of the present invention. Referring to FIG. 13, available resource blocks for system information transmission by the RSU are logically indexed. The logically indexed resource blocks are contiguous. The resources for system information transmission by the RSU may be defined by SI periodicity, the number of resource blocks used for system information transmission, and starting offset for system information transmission.

The resource blocks used for control channel may be represented based on logical resource blocks. The periodicity of control channel may be smaller than the periodicity of system information transmission. For example, the periodicity/offset/duration of control resource pool may be represented in terms of L. For example, when periodicity=L/2, offset=L/4, duration=6, {L/2+L/4 to L/2+L/4+6} resource block in each interval may be used for control channel. The size of one control channel may be fixed. Further, the size of a scheduled data may be changed.

In summary, for SC-PTM transmission by the RSU, dynamic configuration may be proposed which are achieved by semi-statically configured control channel. The semi-statically configured control channel may be multiplexed from multiple SC-PTM sessions which are differentiated by different RNTIs and possibly blind decoding of the V-UE. For blind decoding, multiplexing similar to (E)PDCCH may be considered. To support this, DL transmission including OFDM may be used by the RSU. If UL signaling is used, since it is important to manage single-carrier property, supporting PDCCH structure may not be easily possible. To avoid this, semi-static configuration/mapping between resource and SC-PTM session may be necessary which degrades the flexibility of SC-PTM transmission. On the other hand, if multiple SC-PTM may be multiplexed, a V-UE may have to read many resource blocks before discovering whether there would be any transmission from interested SC-PTM session(s).

To address the above concerns, a list of SC-PTM sessions scheduled in each SI interval with SI transmission may be transmitted. For example, a bitmap may be used. If i-th bit in the bitmap is indicated, it may indicate that one or more SC-PTM sessions with SC-PTM ID % N=i may be scheduled in the current interval. N is the bitmap size. This mechanism may require reading SI before reading SC-PTM control session. This approach reduces the number of resource block to read for control channel. However, it may increase the blocking if there are many SC-PTM sessions used by the RSU.

Figure 14:
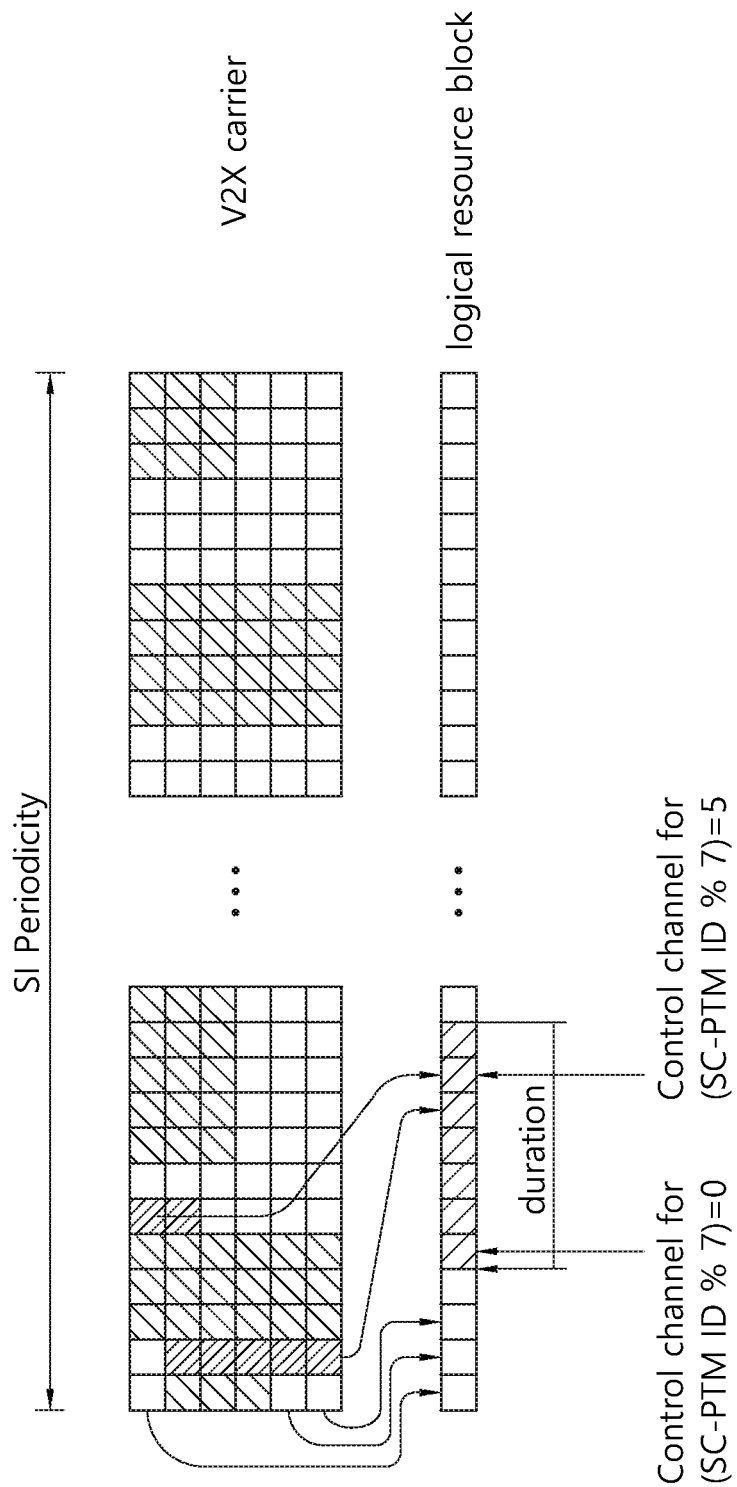
FIG. 14 shows another example of system information transmission by the RSU according to an embodiment of the present invention.

FIG. 14 shows another example of system information transmission by the RSU according to an embodiment of the present invention. Referring to FIG. 14, in addition to resource configuration described in FIG. 13, a bitmap indicating the control channel corresponding to each SC-PTM session may be further indicated. In this embodiment, the first logical resource block may correspond to a control channel with (SC-PTM ID % 7=0), and the sixth logical resource block may correspond to a control channel with (SC-PTM ID % 7=5), and so on.

Alternatively, one PDCCH which can carry multiple scheduling information. Each scheduling information may carry the information of data channel, and SC-PTM session ID. In this case, a V-UE has to read and process each PDCCH to acquire the knowledge whether the interested SC-PTM has been transmitted or not. Alternatively, PDCCH-like multiplexing mechanism may be used, where hashing function and blind decoding may be used to identify any scheduling information.

DL signaling may be used by the RSU, in particular for RSU-E. If different signal format is used, it is necessary to separate resources where DL and UL signal format is used in time-domain. This information may be transmitted via SIB by the RSU.

SIB transmitted by the RSU may be different from SIB transmitted by the regular eNB. The main purpose of SIB transmitted by the RSU is to indicate a resource usage until the next SIB transmission. For example, if SIB is transmitted in every 100 ms, one SIB transmitted by the RSU may define the resource usage in the next 100 ms after SIB transmission. Thus, more generally, SIB transmitted by the RSU may be called as periodic resource allocation information (PRAI), which performs similar function to beacon.

Thus, it is expected that a V-UE needs to read PRAI whenever it wants to access data transmission by the RSU. More generally, the RSU may dynamically adjust resource allocation of the V2X dedicated carrier via PRAI. To minimize the necessity of reading PRAI, there may fixed portion of resources which may be used for direct communication among V-UEs. Those fixed resources may be used for direct communication whereas other resources may be dynamically adjusted by the RSU.

Figure 15:
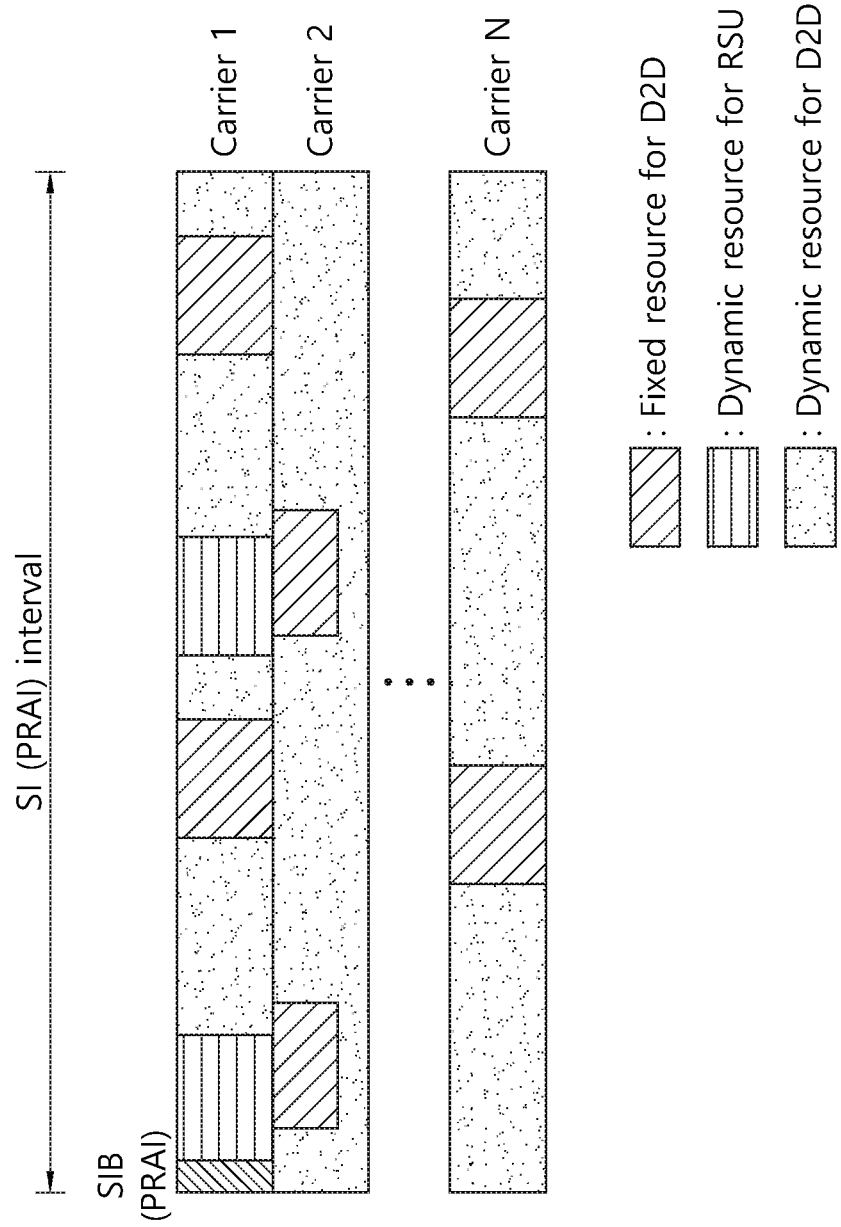
FIG. 15 shows an example of dynamic/fixed resource allocation by a RSU according to an embodiment of the present invention.

FIG. 15 shows an example of dynamic/fixed resource allocation by a RSU according to an embodiment of the present invention. Referring to FIG. 15, there are fixed resources for D2D, i.e. used for direct communication between V-UEs, dynamic resources for RSU, and dynamic resources for D2D which may be adjusted by the RSU.

As there may be no RSU, it is generally desirable to allow more resources for D2D operation with reserving some resources for RSU transmission. In case RSU is not detected, some message may be transmitted (such as decentralized environment notification messages (DENM)) via the resource potentially reserved for the RSU. Or, depending on whether the V-UE detects a RSU or not, different resources for D2D operation may be used. In other words, there may be two resource pools defined based on the presence of the RSU.

Figure 16:
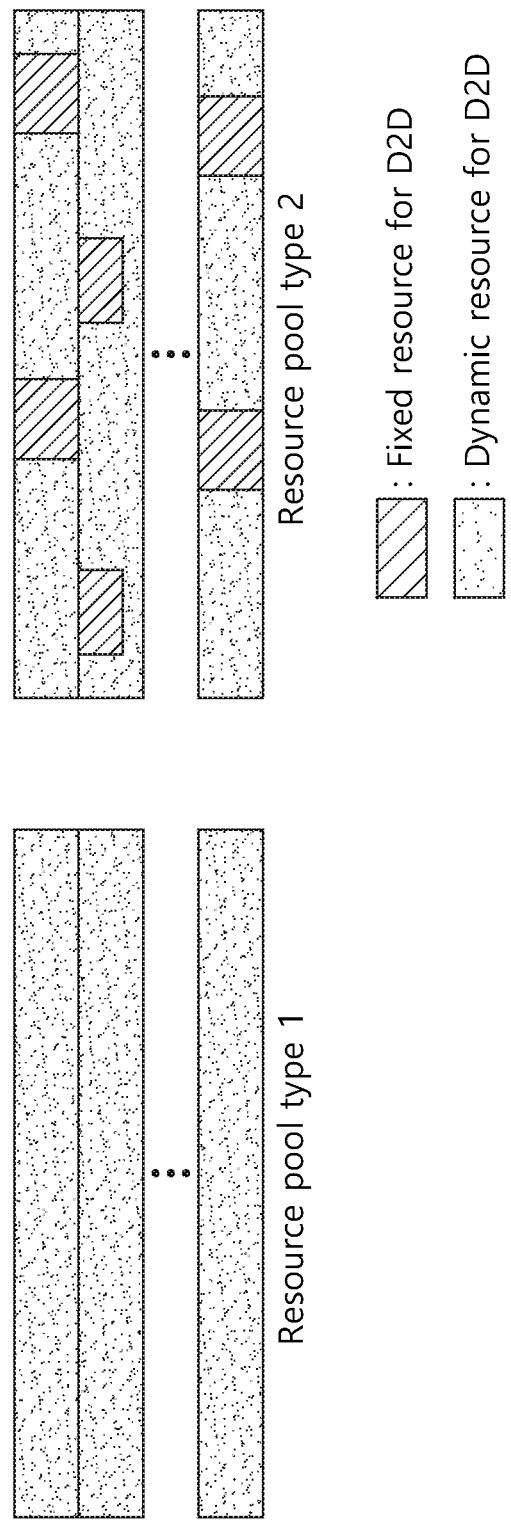
FIG. 16 shows an example of a resource pool for V2X communication according to an embodiment of the present invention.

FIG. 16 shows an example of a resource pool for V2X communication according to an embodiment of the present invention. Referring to FIG. 16, when the RSU is not detected, the resource pool type 1 in which all resources are available for D2D operation may be used. On the other hand, when the RSU is detected, the resource pool type 2 including fixed resources for D2D may be used.

Figure 17:
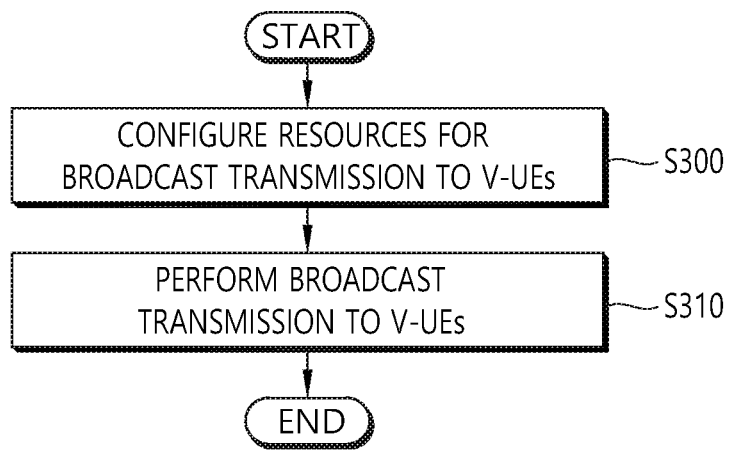
FIG. 17 shows a method for performing, by a RSU for V2X communication, broadcast transmission according to an embodiment of the present invention.

FIG. 17 shows a method for performing, by a RSU for V2X communication, broadcast transmission according to an embodiment of the present invention. This embodiment corresponds to the description regarding resource configuration of SC-PTM/MBMS transmission by the RSU described above.

In step S300, the RSU configures resources for broadcast transmission to V-UEs. The resources for the broadcast transmission may be logically indexed. The resources for the broadcast transmission may be configured by at least one of a periodicity, a number of resource blocks used for the broadcast transmission, or an offset of the broadcast transmission. The broadcast transmission may correspond to system information transmitted by the RSU.

Further, the RSU may transmit a list of SC-PTM sessions scheduled in each system information interval. The list of SC-PTM sessions may correspond to a bitmap in which each bit indicates that a corresponding SC-PTM session is scheduled in a current system information interval.

Figure 18:
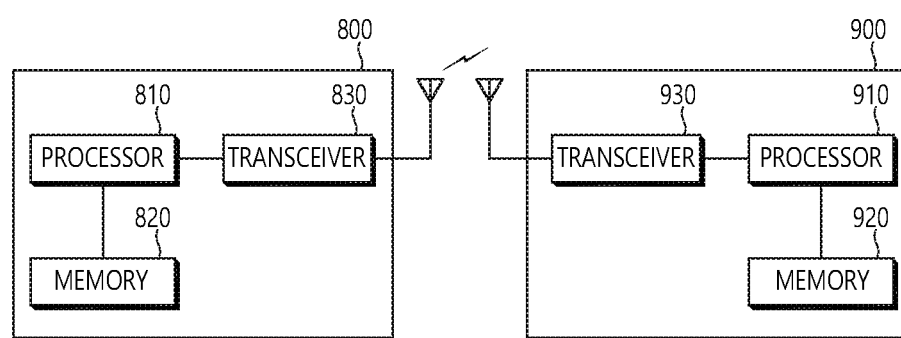
FIG. 18 shows a wireless communication system to implement an embodiment of the present invention.

In step S310, the RSU performs the broadcast transmission to the V-UEs. FIG. 18 shows a wireless communication system to implement an embodiment of the present invention.

A RSU 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A V-UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a road side unit (RSU) for vehicle-to-everything (V2X) communication in a wireless communication system, the method comprising:
    allocating resources for periodical transmission of a system information to vehicle user equipments (V-UEs), wherein the resources include logically indexed resource blocks;
    configuring multiple single-cell point-to-multipoint (SC-PTM) sessions for the V-UEs, wherein the logically indexed resource blocks are mapped to control channels of the multiple SC-PTM sessions, respectively;

transmitting, to the V-UEs, a list of the multiple SC-PTM sessions and mapping information between the logically indexed resource blocks and the control channels of the multiple SC-PTM sessions, wherein the mapping information includes total number of resource blocks in an interval between two transmissions of the system information, a periodicity of the control channels, number of the control channels, and offset of the control channels from an initial resource block of the resources for periodical transmission of a system information; and performing broadcast transmission to the V-UEs based on the multiple SC-PTM sessions, wherein each of the V-UEs acquire at least one of an interested SC-PTM among the multiple SC-PTM, respectively, by calculating location of a certain control channel of the interested SC-PTM based on the list of the multiple SC-PTM and the mapping information between the control channels and the logically indexed resource blocks.

2. The method of claim 1, wherein the periodicity of the control channels is smaller than a periodicity of the periodical transmission of the system information.

* * * * *